Dec. 22, 1925.  B. A. SPINNEY  1,566,993
TRUCK
Filed May 28, 1923
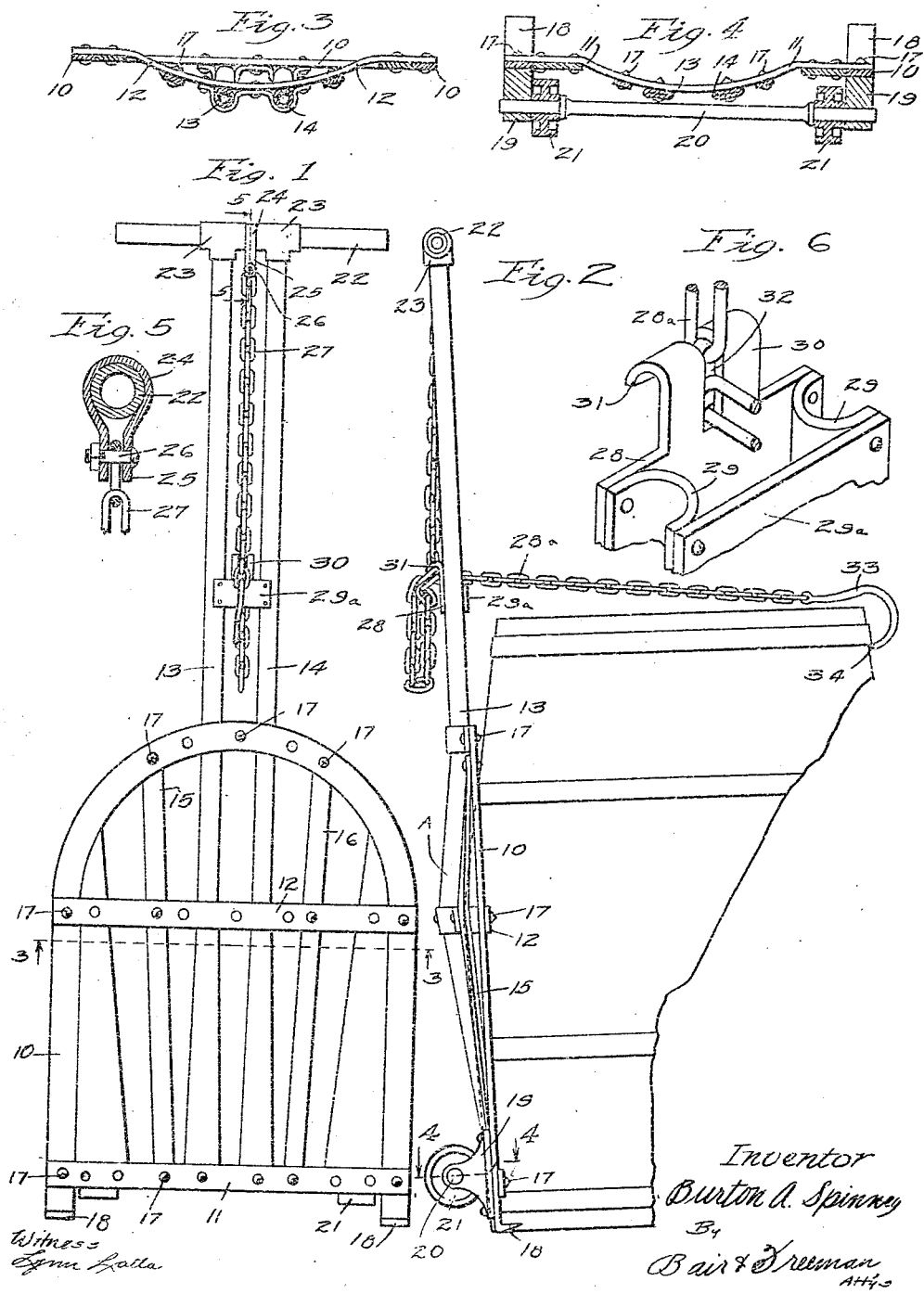

Patented Dec. 22, 1925.

1,566,993

UNITED STATES PATENT OFFICE.

BURTON A. SPINNEY, OF DES MOINES, IOWA.

TRUCK.

Application filed May 28, 1923. Serial No. 641,882.

*To all whom it may concern:*

Be it known that I, BURTON A. SPINNEY, a citizen of the United States, and a resident of Des Moines, in the county of Polk and State of Iowa, have invented a certain new and useful Truck, of which the following is a specification.

The object of my invention is to provide a truck of simple, durable and inexpensive construction.

A further object is to provide such a truck, especially adapted for easily loading barrels and boxes thereon and transporting such barrels and boxes from place to place.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 shows a front elevation of a truck embodying my invention.

Figure 2 shows a side elevation of the same, illustrating the manner of loading a barrel thereon.

Figure 3 shows a detail, sectional view taken on the line 3—3 of Figure 1.

Figure 4 shows a detail, sectional view taken on the line 4—4 of Figure 2, the showing of the barrel being omitted.

Figure 5 shows a detail, sectional view taken on the line 5—5 of Figure 1; and

Figure 6 is a perspective view of the sliding chain holder device.

My improved truck comprises a frame portion consisting of a substantially U-shaped frame, indicated in Figure 1 for instance by the reference numeral 10.

The open lower end of the frame member 10 is connected by a transverse member 11. Between its closed end and its open end, the sides of the U-shaped frame 10 are connected by a cross member 12.

The member 11 is curved slightly from end to end, its central portion being lowest when the device is in use.

The member 12 is also curved somewhat from end to end with its central portion lowest when the device is in carrying position, so as to fit a barrel or the like.

Two handle members 13 and 14 are secured to the members 11 and 12 and to the closed end of the U-shaped frame member 10 and extend away from the frame member 10 a considerable distance, as illustrated in Figure 1.

These handle members are bent as illustrated at A in Figure 2 to conform generally to the shape of a barrel and the shape of the member 12.

The closed end of the U-shaped frame 10 and the members 12 and 11 are connected by frame members 15 and 16.

The upper surface of the member 11 and the closed end of the frame 10 are provided with studs 17 to prevent a barrel or box or the like from slipping from the truck.

The arms of the frame 10 at their free ends are turned at right angles to their body portions to form projecting members 18. Secured to the under surface of the arms of the frame member 10 at their lower free ends are journal brackets 19, which support a transverse shaft 20 on which are small wheels 21.

At the upper end of the handle members 13 and 14, they are provided with a transverse handle 22, which may be mounted on the members 13 and 14 by being extended through T-fittings 23 mounted on the upper ends of the members 13 and 14.

A yoke or the like 24 is mounted on the handle 22 between the members 23 and its ends 25 are connected by means of a bolt 26. Secured to the bolt 26 is a link of a chain 27.

Slidably mounted between the arms 13 and 14 is a chain engaging device comprising a cross member 28. At either end of the member 28 are riveted or otherwise suitably fastened channel-shaped slide elements 29. The slide elements 29 are connected at their other sides by a plate 29$^a$, which serves to brace the structure. The slide elements 29 are designed to receive the arms 13 and 14 for slidingly mounting the chain engaging device thereon.

Extending upwardly toward the handle 22 from the portion 28 is an extension 30, which at its free end is bent over, as at 31, to form another channel-shaped member opening away from the handle 22, as illustrated in Figure 6.

The extension 30 and the portion 31 thereof are provided with a slot 32 to receive a link of the chain 27.

In the practical use of my improved truck, where it is used for instance in transporting barrels from place to place, the truck is shoved along on the wheels 21 until the lower forward end is close to the bottom of the barrel.

On the free end of the chain 27 is a hook 33. The workman hooks the hook 33, which has a sharp point or points 34 over the end of the barrel or the like across the barrel from the truck, as illustrated for instance in Figure 2, and then drops the chain into the slot 32, so that it will be held there.

It will be understood that the chain holding member is slid to position about flush with the top of the barrel before the chain is fastened in place.

During this operation, the truck is arranged to stand, as shown in Figure 2, with the wheels 21 clear of the ground.

After the chain has been fastened, the workman grasps the handle 22 and swings the truck rearwardly until its lower forward end rests on the wheels 21. The truck with its load can then be readily and easily moved from place to place on the wheels.

On account of the manner in which the load, such for instance as a barrel or box, is held on the truck by the chain 28ª, the truck can be manipulated in an inclined position where the center of gravity of the load is almost over the wheels 21. This substantially reduces the amount of labor in handling loads with the truck and also increases the convenience with which the load can be handled.

The depressed portion of the cross bar 11 is of such depth that the heels of the projections 18 will align with the lower edge of the barrel when the truck is moved into position against the barrel. The inner corners of the projections 18 will engage the side of the barrel and when the truck is tipped backward, the barrel will rotate around the heels of the projections and at the same time, its lower edge, as a fulcrum. As the weight is shifted onto the wheels 21, the studs 17 will have gripped the barrel securely enough to hold it in place. Since the barrel is simply tipped over while resting on the floor, there will be no tendency for it to slip forward at the lower edge during the tipping.

The frame 10 is flat and a box may be tilted onto the truck in the same way and will be held by the studs 17 on the frame 10 and by the extensions 18, which sometimes are forced slightly into the material of the box and sometimes engage with the bottom of the box on account of a slight slipping of the latter.

It will be observed that the truck is of very light and simple construction and is easy to move about.

I claim as my invention:

In a device of the class described, a yoke-shaped member, a cross member at the end thereof, a cross member spaced from the ends thereof curved out of the plane of the yoke member, slats connecting said cross members and the closed end of the yoke, a handle comprising a pair of parallel members secured to said cross members and the closed end of the yoke, a transverse handle member mounted on the outer end of said first handle members, a yoke mounted on said last handle member between the first two handle members, a link chain connected with said yoke having a hook on its free end, a sliding member mounted on and between the first two-described handle members having upwardly projecting spaced members terminating in curved ends, and supporting anti-friction elements on the underside of said cross member.

Des Moines, Iowa, January 4, 1923.

BURTON A. SPINNEY.